United States Patent
Yoon

(10) Patent No.: US 7,205,683 B2
(45) Date of Patent: Apr. 17, 2007

(54) CIRCUIT FOR PREVENTING UNINTENTIONAL POWER OFF OF MOBILE TERMINAL AND METHOD THEREOF

(75) Inventor: Byeong Ki Yoon, Kyoungki-do (KR)

(73) Assignee: Curitel Communications, Inc (KR)

( * ) Notice: Subject to any disclaimer, the term of this patent is extended or adjusted under 35 U.S.C. 154(b) by 420 days.

(21) Appl. No.: 10/699,306

(22) Filed: Oct. 30, 2003

(65) Prior Publication Data

US 2004/0124712 A1    Jul. 1, 2004

(30) Foreign Application Priority Data

Dec. 11, 2002    (KR) .................. 10-2002-0078696

(51) Int. Cl.
*H01H 35/00* (2006.01)
(52) U.S. Cl. ..................................... 307/116
(58) Field of Classification Search ................. 307/116
See application file for complete search history.

(56) References Cited

U.S. PATENT DOCUMENTS

| | | | |
|---|---|---|---|
| 5,233,645 A | 8/1993 | Choi et al. | |
| 5,726,636 A | 3/1998 | Hayes, Jr. | |
| 6,300,690 B1 | 10/2001 | Jokela | |
| 6,363,146 B1 | 3/2002 | Aranovich et al. | |

FOREIGN PATENT DOCUMENTS

| | | |
|---|---|---|
| EP | 0280501 | 2/1988 |
| EP | 0607919 | 1/1994 |
| EP | 0 665 627 A2 | 2/1995 |
| EP | 1107120 | 11/2000 |
| JP | 06-350748 | 12/1994 |
| KR | 1019890002191 | 6/1989 |
| KR | 20-0174750 | 1/2000 |
| KR | 2000-0000026 | 1/2000 |
| KR | 1020010002907 | 1/2001 |
| KR | 10200100002908 | 1/2001 |
| KR | 1020010048226 | 6/2001 |

*Primary Examiner*—Chau N. Nguyen
*Assistant Examiner*—Dru Parries
(74) *Attorney, Agent, or Firm*—Blakely Sokoloff Taylor & Zafman

(57) ABSTRACT

A circuit for preventing temporally power off of potable electric devices by loose contact of battery is disclosed. The circuit includes a power charge unit for receiving a first state signal representing a state of the mobile terminal from a main chip set, changing or maintaining a state of a second state signal according to the state of the first state signal, and outputting the second state signal; an enable power signal generator for generating a power-on enable signal by receiving the second state signal or by receiving a power key input signal; and a voltage control unit for supplying electric power to the main chip set of the mobile terminal in response to the power-on enable signal by controlling the electric power to the mobile terminal. The present invention can increase efficiency of packaging size.

4 Claims, 5 Drawing Sheets

| J | K | $Q_{n+1}$ | OPERATE |
|---|---|---|---|
| 0 | 0 | $Q_n$ | INVARIANT |
| 0 | 1 | 0 | RESET |
| 1 | 0 | 1 | SET |

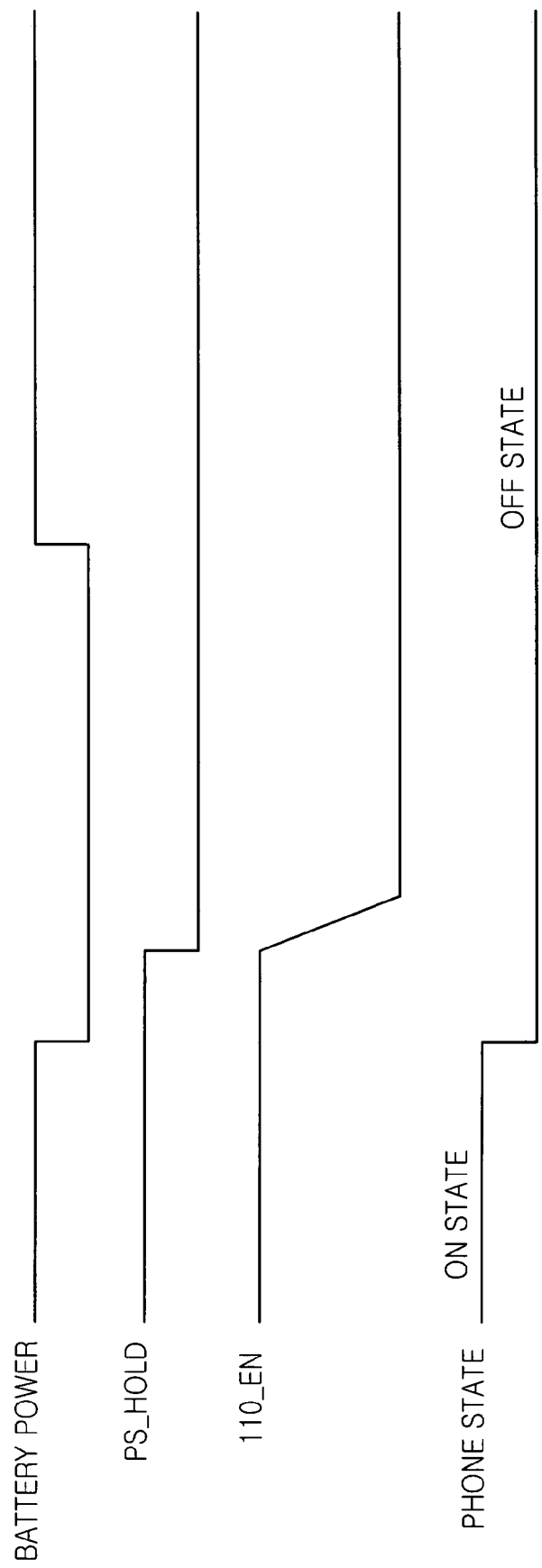

| J | K | $Q_{n+1}$ | OPERATE |
|---|---|---|---|
| 0 | 0 | $Q_n$ | INVARIANT |
| 0 | 1 | 0 | RESET |
| 1 | 0 | 1 | SET |

CIRCUIT FOR PREVENTING UNINTENTIONAL POWER OFF OF MOBILE TERMINAL AND METHOD THEREOF

FIELD OF THE INVENTION

The present invention relates to a circuit and method for preventing unintentional power off of a mobile terminal caused by loose contact with a battery; and, more particularly, to a circuit and method for preventing temporally power off of a mobile terminal caused by loose contact with the battery by automatically turning on the mobile terminal.

DESCRIPTION OF RELATED ARTS

FIG. 1A is a circuit diagram showing conventional power circuit. The conventional power circuit includes a first resistor 101 connected to an input line of a power hold signal PS_HOLD; a second resistor 102 having a first end connected to an input line of a power on key input signal ON_SW; a first capacitor 103 having a first end connected to a second end of the second resistor 102 and having a second end connected to a ground; a third resistor 104 having a first end connected to an input line of control voltage 2.7 V_D and having a second end forming an output end of a power on key transfer signal ON_SW_SEN/; a TR switch 105 electrically connecting an emitter end and a collector end in case that a second logical step (high) signal inputted from a base end; a first diode 106 having a positive end connected to the second end of the second resistor 101 for passing a power maintaining signal; a fourth resistor 108 having a first end connected to negative ends of the first diode 106 and a second diode 107 and having a second end connected to the ground; a second capacitor 109 having a first end connected to a power of battery and having a second end connected to a ground; a regulator 110 having an input end IN connected to a power of battery (VBATT), having a ground end (GND) connected to the ground, having an enable end for receiving an enable signal and having an output end for outputting a voltage level controlled battery power after controlling a regulated voltage level of the power of battery (VBATT) received through the input end; a third capacitor 111 having a first end connected to a reference end of the regulator 110 and having a second end connected to the ground; a fourth capacitor 112 having a first end connected to the output end OUT of the regulator 110 and having a second end connected to the ground and a fifth capacitor 113 having a first end connected to the output end OUT of the regulator and having a second end connected to the ground.

FIG. 1B is a timing diagram illustrating operations of the conventional power circuit of FIG. 1.

Referring to the FIG. 1B, operations of the conventional power circuit is explained hereinafter. When a power is temporally off by loose contact of the battery, a power hold signal (PS_HOLD) becomes a first logical stage (LOW) and an enable signal (110_EN) becomes un-activated. Therefore, an ON state of mobile terminal is transferred to OFF state.

In case of the conventional mobile terminal such as a potable electric device including a personal data assistance PDA, a mobile phone, a radio and a notebook computer equipping the above mentioned conventional power circuit, a tensile force of a battery is decreased corresponding to time of using the conventional mobile terminal and also an oxidation or damage of contact parts of the battery caused by carelessness use of the mobile terminal such as accidentally dropping the mobile terminal. As a result, a power frequently and temporally becomes a power off state by loose contact between the battery and the mobile terminal.

For overcoming abovementioned problems, various methods for preventing temporal power off have been suggested. A first method is disclosed at Korean Patent No. 313922. It includes an additional battery. A power source of the mobile terminal is changed from main battery to the additional battery by operations of a switch when the contact becomes loosen. In more detail, the mobile terminal having a first and a second power source providing a power to main circuit of the mobile terminal includes a first switching unit for switching a power of the first power source to a main circuit of the mobile terminal; a power voltage level measure unit for measuring a level of power voltage outputting from the first power source; a second switching unit for switching in order to selectively connect the first power source and the second power source in series; a mobile station modem (MSM) for controlling the second switching unit in order to connect the first power source and the second power source in series when the power voltage level measured by the power voltage level measuring unit is decreased under pre-set power voltage level. A second method for preventing temporal power off of potable electric device is implementation of high capacity capacitor at a power unit of the battery.

However, the above-mentioned methods increase complexity of switching circuit and manufacture cost. Furthermore, a size of packaging is increased by the additional elements.

SUMMARY OF THE INVENTION

It is, therefore, an object of the present invention to provide a circuit and method for preventing temporal power off of a mobile terminal such as a potable electric device including a personal data assistance PDA, a mobile phone, a radio and a notebook computer by automatically turning on temporal power off state of the mobile terminal by using a flip-flop.

In accordance with an aspect of the present invention, there is provided a circuit for preventing unintentional power off of a mobile terminal, including: a power charge unit for receiving a first state signal representing one of a state of the mobile terminal, which are a state of power-on or a state of power-off, from a main chip set of the mobile terminal, changing or maintaining a state of a second state signal according to the state of the first state signal, and outputting the second state signal when the state of the second state signal is a state of power-on; an enable power signal generator for generating a power-on enable signal by receiving the second state signal from the power charge unit or by receiving a power key input signal, which is generated by a user of the mobile terminal to turn on the mobile terminal; and a voltage control unit for supplying electric power from the power charge unit to the main chip set of the mobile terminal in response to the power-on enable signal from the enable power signal generator by controlling the electric power to be suitable for the mobile terminal.

In accordance with an aspect of the present invention, there is also provided a method for preventing unintentional power off of a mobile terminal, which has a power charge unit for supplying electric power to the mobile terminal, an enable signal generator for generating a power-on enable signal to turn on the mobile terminal, and a voltage controller for supplying the suitable electric power to a main chip set of the mobile terminal in response to the power-on enable signal, the method including the steps of: a) turning on the mobile terminal when one of a second state signal from the power charger unit and the power key input signal inputted from a user of the mobile terminal is inputted to the enable signal generator; b) generating a first state signal at the main chip set of the mobile terminal and outputting the first state signal to the power charger unit to set the state of the first state signal as power-on after turning on the mobile terminal; c) changing or maintaining a state of the second state signal according to the state of the first state signal, which is power-on, in order to generate the second state signal at the power charger unit; d) generating the first state signal at the main chip set and outputting the first state signal to the power charger unit to set the first state signal's state as power-off when a power off signal is inputted by a user; e) changing the state of the second state signal according to the state of the first state signal, which is power-off, in order to inactivate the second state signal at the power charger unit; and f) turning off the mobile terminal after inactivating the second state signal.

BRIEF DESCRIPTION OF THE DRAWING(S)

The above and other objects and features of the present invention will become apparent from the following description of the preferred embodiments given in conjunction with the accompanying drawings, in which:

FIG. 1B is a timing diagram for explaining operations of the conventional power circuit;

DETAILED DESCRIPTION OF THE INVENTION

Other objects and aspects of the invention will become apparent from the following description of the embodiments with reference to the accompanying drawings, which is set forth hereinafter.

Figure 1A:
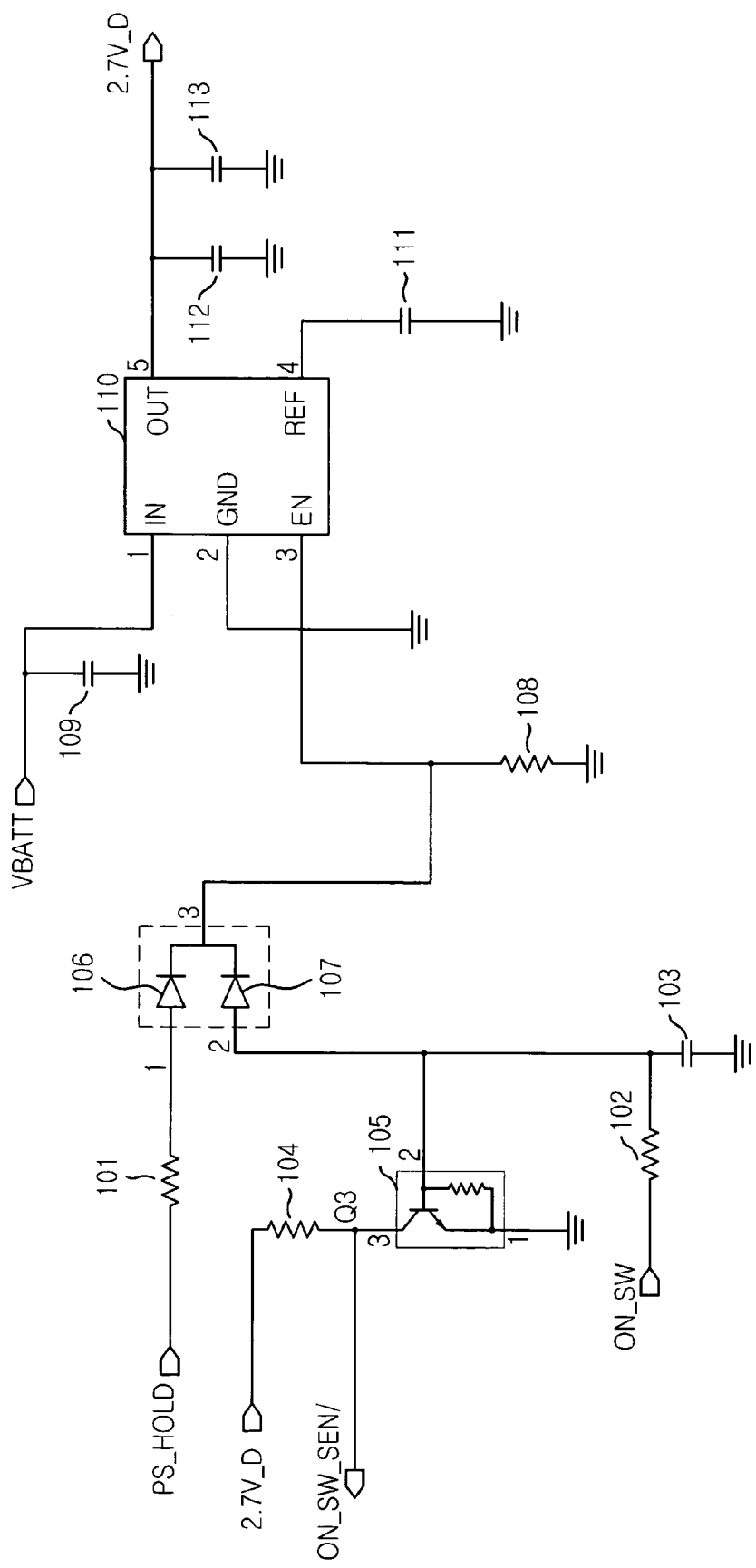
FIG. 1A is a circuit diagram showing a conventional power circuit.
Figure 2:
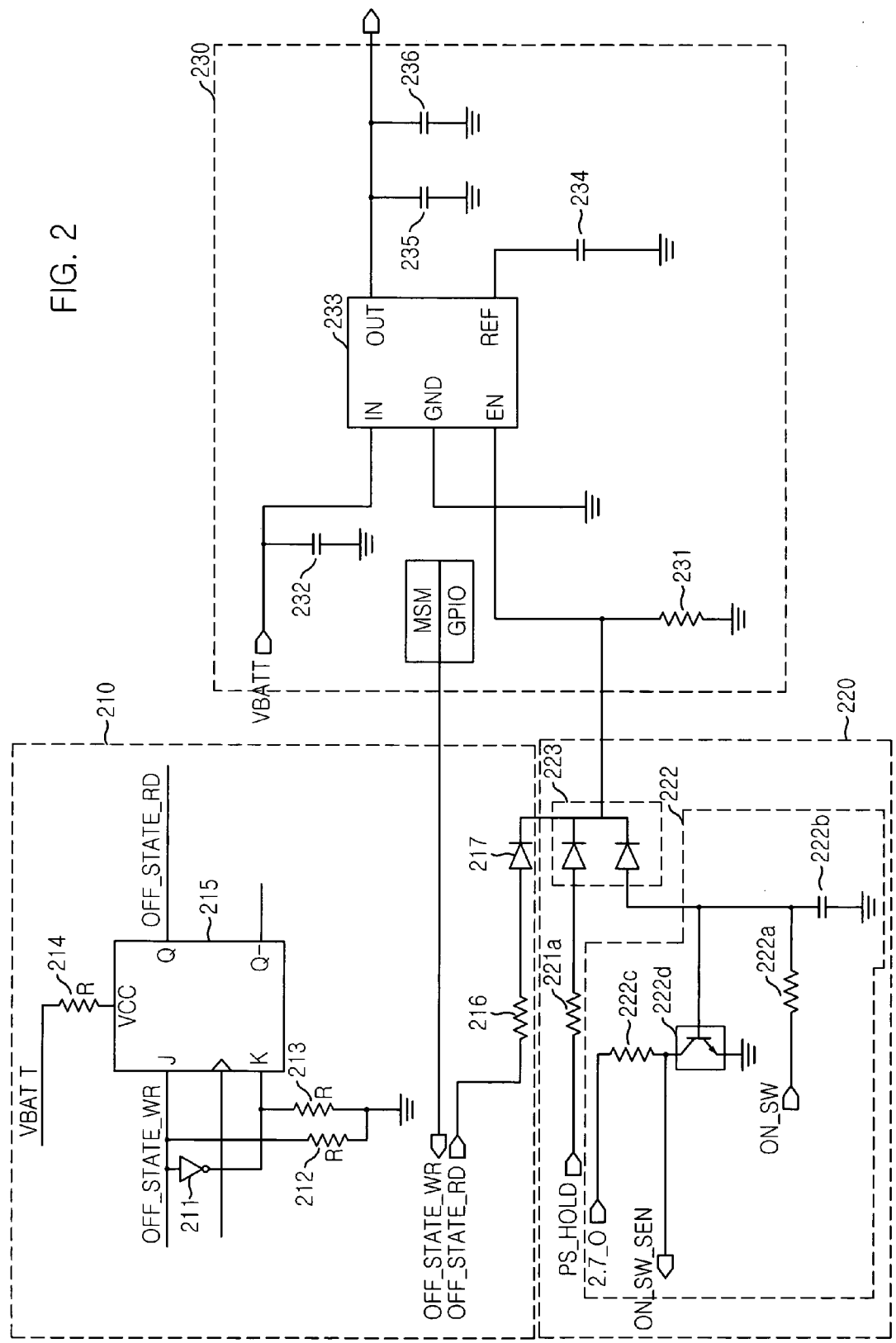
FIG. 2 is a block diagram illustrating a circuit for preventing unintentional power off of a mobile terminal in accordance with a preferred embodiment of the present invention.

FIG. 2 is a circuit diagram representing a circuit for preventing unintentional power off of a mobile terminal in accordance with a preferred embodiment of the present invention. Referring to the FIG. 2, the circuit includes a power charger 210, an enable signal generator 220 and a voltage controller 230. The enable signal generator 220 and the voltage controller 230 are included in the mobile terminal.

The power charger 210 receives a first state signal (OFF_STATE_WR), which represents a state of the mobile terminal, from GPIO pin of a main chip set MSM. _The power charger 210 generates a second state signal (OFF_STATE_RD), which represents one of RESET, SET or INVARIANT according to the first state signal (OFF_STATE_WR). The second state signal is outputted to the voltage controller 230 as an enable signal (EN) through the enable signal generator 220. Hereinafter, the power charger 210 is explained in detail.

The power charger 210 includes an inverter 211, a first resistor 212, a second resistor 213, a third resistor diode 217.

The inverter 211 equipped inside of the battery receives the first state signal (OFF_STATE_WR) outputted from the GPIO pin of MSM and inverts the first state signal. The inverted first state signal is outputted.

The first resistor 212 equipped inside of the battery supplies a resistance value. The first resistor 212 has a first end connected to the OFF_STATE_WR and has a second end connected to the ground.

The second resistor 213 equipped inside of the battery also supplies a resistance value. The second resistor 212 has a first end connected to an output end of the ground.

The third resistor 214 is equipped inside of the battery and supplies a resistance value. The third resistor 214 has a first end is connected to a voltage of battery (VBATT).

Figures 3, 4A:
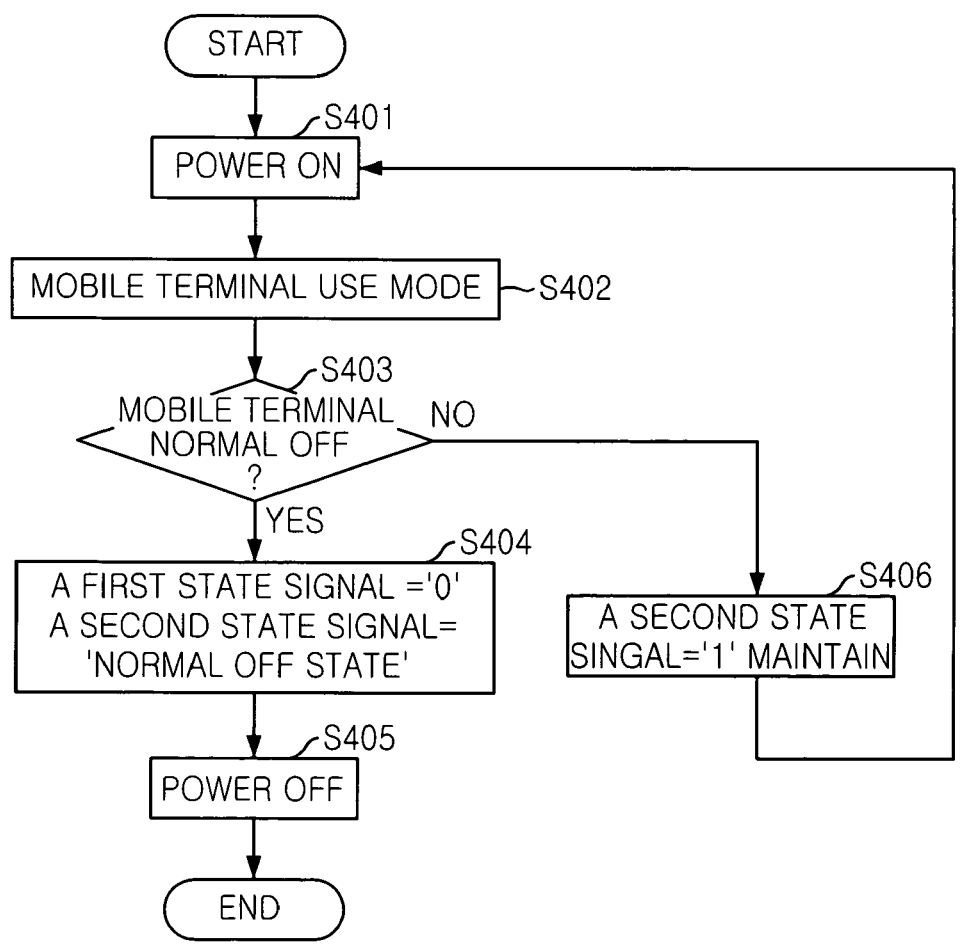
FIG. 3 is a truth table of a flip-flop equipped in the circuit of FIG. 2 in accordance with a preferred embodiment of the present invention.
FIGS. 4A and 4B are flowcharts for explaining operations of a circuit for preventing unintentional power off of a mobile terminal in accordance with a preferred embodiment of the present invention.

The JK flip-flop 215 is equipped inside of the battery and has a power supply end connected to the second end of the third resistor 214. The JK flip-flop 215 receives the first state signal (OFF_STATE_WR) to a J end and receives an output signal of the inverter 211 to a K end. Also, the JK flip-flop 215 outputs an output signal of a Q end as the second state signal (OFF_STATE_RD). Inhere, a truth table of the JK flip-flop 215 is shown in FIG. 3.

The fourth resistor 216 supplies a resistance value. The fourth resistor 216 has a first end connected to the Q end of the JK flip-flop 215.

The first diode 217 has a positive end connected to the second end of the fourth resistor 216 and passes the second state signal (OFF_STATE_RD) as the enable signal.

In a meantime, the enable signal generator 220 receives a power key input signal (ON_SW) and a power hold signal (PS_HOLD). At the initialization, the enable signal generator 220 activates the enable signal by activation of the power key input signal (ON_SW) and after the initialization, the enable signal generator 220 maintains to activate the enable signal by activation of the power hold signal (PS_HOLD). Hereinafter, the enable signal generator 220 is explained in detail.

The enable signal generator 220 includes a fifth resistor 221a and a power input unit 222.

The fifth resistor 221a supplies a resistance value. The fifth resistor has a first end connected to an input line of the power hold signal (PS_HOLD) and has a negative end connected to a signal transfer unit 223.

The power input unit 222 receives the power key input signal (ON_SW) and outputs the key input signal (ON_SW) to the signal transfer unit 223. The power input unit 222 also generates and outputs a power key transfer signal (ON_SW_SEN/) which represents an activation of the power key input signal (ON_SW). Hereinafter the power input unit 222 is explained in detail.

The power input unit 222 includes a sixth resistor 222a, a first capacitor 222b, a seventh resistor 222c and a TR switch 222d.

The sixth resistor 222a supplies a predetermined resistance value by being connected to the input line of the power key input signal (ON_SW).

The first capacitor 222b supplies a capacitance. The first capacitor has a first end connected to the second end of the sixth resistor 222a and has a second end to the ground.

The seventh resistor 222c supplies a predetermined value of resistor. The seventh resistor 222c has a first end connected to an input line of control voltage 2.7 V_D and has a second end forming an output end of the power key transfer signal (ON_SW_SEN/).

The TR switch 222d has a gate end connected to the second end of the sixth resistor 222a and establishes electrical paths of a emitter end and a collector end in case of receiving a second logical stage (HIGH) into a base end.

In a meantime, the 2 port-diodes 223 recieved the power hold signal (PS_HOLD) from the power charger 221 and transfers the power key input signal (ON_SW) from the power input unit 222. Hereinafter, the signal transfer unit 223 is explained in detail.

The 2 port-diode 223 includes a second diode 223a and a third diode 223b.

The second diode 223a has a positive end connected to the power charger 221 and transfers the power hold signal (PS_HOLD) to the voltage control unit 230.

In a meantime, the voltage controller 230 received the power of battery (VBATT) and control the power of battery (VBATT) to be suitable power (2.7 V_D) for supplying to the mobile terminal in case that the enable signal (EN) is activated by the second state signal inputted from the power charger 210 or the power key input signal and the power hold signal inputted from the enable signal generator 220.

Hereinafter, the voltage controller 230 is explained in detail.

The voltage controller 230 includes the eighth resistor 231, a second capacitor 232, a regulator 233, a third capacitor 234, a fourth capacitor 235 and a fifth capacitor 236.

The eighth resistor supplies a resistance value. The eight resistor has a first end connected to the output end of the signal transfer unit 223 and has a second end connected to the ground.

The second capacitor 232 supplies a capacitance. The second capacitor 232 has a first end connected to the power of the battery (VBATT) and has a second end connected to the ground.

The regulator 233 has an input end (IN) connected to the power of the battery (VBATT) and a ground end (GND) connected to the ground. Also, an enable end (EN) of the regulator 233 receives the enable signal from the power charger 210 or the enable signal generator 220 and controls a voltage level of the power of battery (VBATT) inputted from the input end. The voltage-controlled power of battery is outputted through an output end of the regulator 233.

The third capacitor 234 supplies a capacitance. The third capacitor 234 has a first end connected to a reference end (REF) of the regulator and has a second end connected to the ground.

The fourth capacitor 235 supplies a capacitance. The fourth capacitor 235 has a first end connected to the output end (OUT) of the regulator and has a second end connected to the ground.

The fifth capacitor 236 supplies a capacitance. The fifth capacitor 236 has a first end connected to the output end (OUT) of the regulator 233 and has a second end connected to the ground.

Hereinafter, operations of the circuit for preventing temporally power off of the mobile terminal in accordance with a preferred embodiment of the present invention are explained.

At first, a flip-flop 215 is equipped inside of the battery for noticing a state of the mobile terminal in order to indicate unintentional power off of the mobile terminal. The flip-flop 215 reflects a value of the first state signal (OFF_STATE_WR) according to a truth table shown in FIG. 3. If the state signal (OFF_STATE_WR) of the mobile terminal becomes a floating state by unintentional power off of the mobile terminal, a final value of the second state signal (OFF_STATE_RD) is maintained by becoming the input of JK as '00' based on two resistance values of a battery pull down resistor 212 and 213 since the flip-flop 215 is equipped inside of the battery.

Figure 4B:
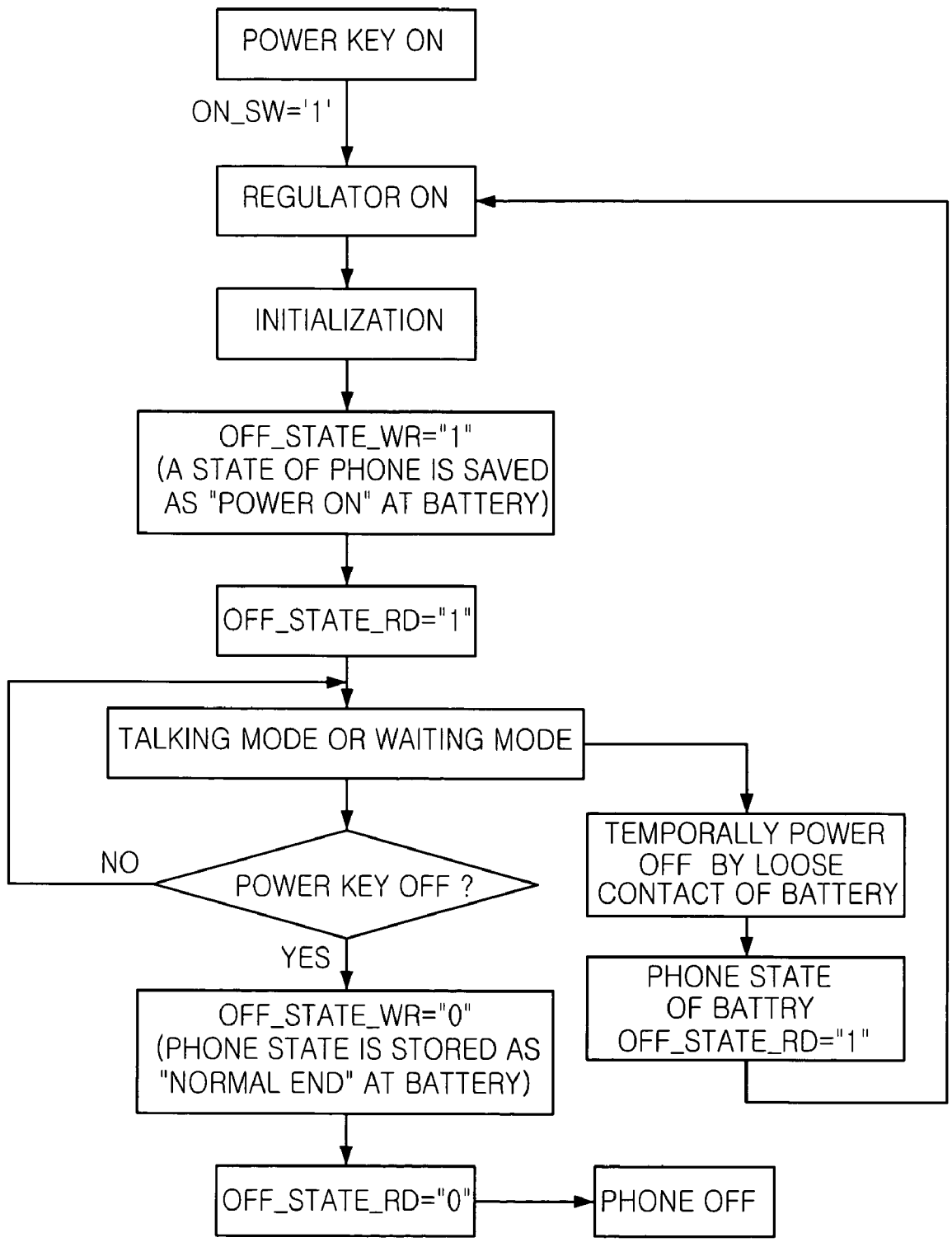

FIGS. 4A and 4B are flowcharts for explaining a method for preventing unintentional power off of a mobile terminal in accordance with a preferred embodiment of the present invention. Referring to FIGS. 4A and 4B, operations of the method for preventing unintentional power off of the mobile terminal are explained.

At first, a power of the mobile terminal is turned on by a user at step S401.

At step 402, if the second state signal (OFF_STATE_RD) is 0 (normal power-off), then the second state signal (OFF_STATE_RD) is changed to 1 (power-on), by the MSM setting a first state signal (OFF_STATE_WR) as 1. If the second state signal (OFF_STATE RD) is 1, then the second state signal (OFF_STATE_RD) is maintained to 1 by setting the first state signal (OFF_STATE_WR) as 1. By the above-mentioned operations, a state of the mobile terminal is set to the state of use at step 402.

After step S402, it is determined whether the mobile terminal is powered OFF or not at step S403.

At step S404, if the mobile terminal is powered off, then the first state signal value is set to '0' by the MSM and the second state signal value is set to '0' by the flip-flop. That is, it means the mobile terminal is normally powered off by user's key input.

After step S404, the MSM equipped in the mobile terminal stores a state of power off and then the mobile terminal is normally turned off at step 405.

In a meantime, if the mobile terminal is unintentionally powered off by loose contact of the battery, the second state signal is stored in the flip-flop as '1' because two pull-down registers 212 and 211 make the flip-flop invariant state. Then the mobile terminal is automatically powered on at step S406.

FIG. 4B is a flowchart for explaining a method for preventing unintentional power off of a mobile terminal in accordance with another preferred embodiment of the present invention in more detail.

As mentioned above, the present invention can prevent unintentionally power off of the mobile terminal caused by loose contact with the battery by equipping a flip-flop inside of the battery. Therefore, it can decrease complexity of switching circuit and manufacture cost since the present invention does not require additional power source or the switching circuit. Furthermore, the present invention can increase efficiency of packaging of the mobile terminal.

While the present invention has been described with respect to certain preferred embodiments, it will be apparent to those skilled in the art that various changes and modifications may be made without departing from the scope of the invention as defined in the following claims.

What is claimed is:

1. A circuit for preventing unintentional power off of a mobile terminal, comprising:

a power charge unit for receiving a first state signal representing a state of the mobile terminal from a main chip set of the mobile terminal, changing or maintaining a state of a second state signal, which represents a normal power off of the mobile terminal and an abnormal power off of the mobile terminal, according to the state of the first state signal, and outputting the second state signal for representing a power on state to the mobile terminal when electric power is re-applied to the mobile terminal in the state of the abnormal power off of the mobile terminal;

an enable signal generator for generating a power-on enable signal by receiving the second state signal from the power charge unit; and a voltage control unit for supplying the electric power from the battery to the main chip set of the mobile terminal in response to the power-on enable signal from the enable power signal generator by controlling the electric power to be suitable for the mobile terminal, wherein the power charge unit comprises:

a battery; and a JK flip-flop comprising a power supply end connected to the battery, a J end for receiving the first state signal, a K end for receiving an inverted signal of the first state signal, and a Q end for outputting an output signal as a second state signal.

2. The circuit as recited in claim 1, wherein the enable signal generator receives a power key input signal, which invokes to generate a power-hold signal in order to generate the power-on enable signal and the power-hold signal can be substituted by the second state signal.

3. The circuit as recited in claim 1, wherein the power charge unit further comprises an inner battery unit equipped inside of the battery and an outer battery unity equipped outside of the battery, wherein the inner battery unit has;

an inverter for receiving the first state signal and inverting the first state signal;

a first resistor having a first end connected to an input line of the first state signal and a second end connected to a ground; and a second resistor having a first end connected to an output end of the inverter and a second end connected to the ground;

a third resistor for having a first end connected to electric power of the battery and a second end connected to the power supply end of the JK flip-flop, wherein the outer battery unit has:

a fourth register for having a first end connected to the Q end of said JK flip-flop; and a first diode for a positive end connected to the second end of the fourth register and passing the second state signal as an enable signal.

4. A method for preventing unintentional power off of a mobile terminal, which has a power charge unit for supplying electric power to the mobile terminal, an enable signal generator for generating a power-on enable signal to turn on the mobile terminal, and a voltage controller for supplying the suitable electric power to a main chip set of the mobile terminal in response to the power-on enable signal, the method comprising the steps of:

a) turning on the mobile terminal when one of a second state signal from the power charger unit and the power key input signal inputted from a user of the mobile terminal is inputted to the enable signal generator;

b) generating a first state signal at the main chip set of the mobile terminal and outputting the first state signal to the power charger unit to set the state of the first state signal as power-on at the power charge unit after turning on the mobile terminal;

c) changing or maintaining a state of the second state signal according to the state of the first state signal, which is power-on, in order to generate the second state signal at the power charger unit;

d) generating the first state signal at the main chip set and outputting the first state signal to the power charger unit to set the first state signal's state as power-off when a power off signal is inputted by a user;

e) changing the state of the second state signal according to the state of the first state signal, which is power-off, in order to inactivate the second state signal at the power charger unit;

f) turning off the mobile terminal after inactivating the second state signal; and g) returning to step a) by the second state signal having the state of power-on, when electric power is re-applied to the mobile terminal in case that the mobile terminal is unintentionally powered off by loose contact with the power charge unit, wherein the second state signal having the state of power-on is outputted from a JK flip-flop included in the power charge unit, wherein the JK flip-flop comprises, a power supply end connected to a battery included in the power charge unit, a J end for receiving the first state signal, a K end for receiving an inverted signal of the first state signal, and a Q end for outputting an output signal as a second state signal.

* * * * *